United States Patent
Ju et al.

(10) Patent No.: US 11,897,041 B2
(45) Date of Patent: Feb. 13, 2024

(54) TURRET TOOL POST OF MACHINE TOOL

(71) Applicant: DN SOLUTIONS CO., LTD., Changwon-si (KR)

(72) Inventors: Taehwan Ju, Gimhae-si (KR); Hyunwoo Kim, Gimhae-si (KR)

(73) Assignee: DN SOLUTIONS CO., LTD., Changwon-si (KR)

( * ) Notice: Subject to any disclaimer, the term of this patent is extended or adjusted under 35 U.S.C. 154(b) by 197 days.

(21) Appl. No.: 16/960,041

(22) PCT Filed: Jan. 2, 2019

(86) PCT No.: PCT/KR2019/000025
§ 371 (c)(1),
(2) Date: Sep. 11, 2020

(87) PCT Pub. No.: WO2019/135591
PCT Pub. Date: Jul. 11, 2019

(65) Prior Publication Data
US 2020/0398346 A1   Dec. 24, 2020

(30) Foreign Application Priority Data
Jan. 3, 2018 (KR) .......................... 10-2018-0000623

(51) Int. Cl.
*B23B 7/04* (2006.01)
(52) U.S. Cl.
CPC .......... *B23B 7/04* (2013.01); *B23Q 2220/002* (2013.01)

(58) Field of Classification Search
CPC ..... B23B 29/24; B23B 29/244; B23B 29/246; B23B 29/242; B23B 29/26; B23B 29/34;
(Continued)

(56) References Cited

U.S. PATENT DOCUMENTS 4,519,279 A * 5/1985 Ruggeri ................... B23Q 1/76
82/162
10,150,193 B2 * 12/2018 Lai ........................ B23Q 1/0027
(Continued)

FOREIGN PATENT DOCUMENTS

JP          60034202 A  *  2/1985
KR       1020150025447 A     3/2015
(Continued)

OTHER PUBLICATIONS

International Search Report of PCT/KR2019/000025, dated Apr. 1, 2019, English translation.

*Primary Examiner* — Ryan Rufo
(74) *Attorney, Agent, or Firm* — STIP Law Group, LLC

(57) ABSTRACT

The present disclosure relates to a turret tool post for a machine tool, the turret tool post including: a tool post body; a turret installed on the tool post body and configured to receive a plurality of tools; a drive unit installed on the tool post body and configured to provide rotational power to the turret; a rotary unit installed on a part of the turret so as to be rotated together with the turret and coupled to an optional unit; and a fixing unit installed on the tool post body and configured to be clamped with or unclamped from the rotary unit by a rotation of the rotary unit in order to allow or cut off a supply of pressure required for an operation of the optional unit.

2 Claims, 12 Drawing Sheets

(58) Field of Classification Search
CPC .......... B23B 7/04; B23B 39/025; B23B 3/16;
B23B 3/161; B23B 3/162; B23B 3/164;
B23B 3/165; B23B 3/167; B23B 3/168;
B23Q 2220/002; B23Q 1/766; B23Q
1/66; B23Q 16/08; B23Q 2039/004;
B23Q 1/76; Y10T 82/2506; Y10T
82/2508; Y10T 82/2587
See application file for complete search history.

(56) References Cited

U.S. PATENT DOCUMENTS

2009/0001643 A1\* 1/2009 Rehm .................... B23Q 11/10
269/55
2012/0186053 A1 7/2012 Meidar et al.

FOREIGN PATENT DOCUMENTS

| KR | 1020150064777 A | | 6/2015 |
|----|-----------------|---|--------|
| KR | 1020160109000 A | | 9/2016 |
| KR | 20160128102 A | \* | 11/2016 |
| KR | 1020160128102 A | | 11/2016 |

\* cited by examiner

TURRET TOOL POST OF MACHINE TOOL

CROSS-REFERENCE TO RELATED APPLICATIONS

This application is the U.S. National Phase under 35 U.S.C. § 371 of International Application No. PCT/KR2019/000025 filed on Jan. 2, 2019, which in turn claims the benefit of Korean Application No. 10-2018-0000623, filed on Jan. 3, 2018, the disclosures of which are incorporated by reference into the present application.

FIELD OF THE DISCLOSURE

The present disclosure relates to a turret tool post for a machine tool, and more particularly, to a turret tool post for a machine tool, in which a rotary unit and a fixing unit may be clamped or unclamped by a rotation of the rotary unit and a forward or rearward movement of the fixing unit in order to allow or cut off a supply of pneumatic or hydraulic pressure required to operate an optional unit, thereby improving productivity of a machine tool.

BACKGROUND OF THE DISCLOSURE

In general, a machine tool refers to a machine used to process metal/non-metal workpieces in a desired shape and dimension using a suitable tool by using various types of cutting or non-cutting methods.

Various types of machine tools including a turning center, a vertical/horizontal machining center, a door-type machining center, a Swiss turning machine, an electric discharge machine, a horizontal NC boring machine, a CNC lathe, and a multi-tasking machining center are being widely used to suit the purpose of the corresponding work in various industrial sites.

The multi-tasking machining center, among the machine tools, refers to a turning center equipped with a multifunctional automatic tool changer (ATC) and a tool magazine in order to perform various types of processing such as turning machining, drilling, tapping, or milling. In the case of the multi-tasking machining center, an operator manually mounts a tool on a tool magazine when loading the tool required for a machining process or changing the tools.

In general, various types of currently used machine tools each have a control panel to which a numerical control (NC) technology or a computerized numerical control (CNC) technology is applied. The control panel is provided with a multifunctional switch or button, and a monitor.

Further, the machine tool includes a table on which a material, i.e., a workpiece is seated and which transfers the workpiece to machine the workpiece, a palette used to prepare the workpiece to be machined, a main shaft coupled to a tool or the workpiece and configured to be rotated, and a tailstock and a steady rest configured to support the workpiece during the machining process.

In general, the machine tool is provided with a transfer unit configured to transfer the table, a tool post, the main shaft, the tailstock, and the steady rest along a transfer shaft in order to perform various types of machining.

In general, the machine tool uses a plurality of tools in order to perform various types of machining, and a tool magazine or a turret is used in the form of a tool storage place for receiving and storing the plurality of tools.

The machine tool uses the plurality of tools in order to perform various types of machining, and the tool magazine is used in the form of a tool storage place for receiving and storing the plurality of tools.

In general, the machine tool is equipped with the automatic tool changer (ATC) configured to withdraw a specific tool from the tool magazine or remount the tool on the tool magazine based on an instruction of a numerical control unit in order to improve productivity of the machine tool.

In general, the machine tool is equipped with an automatic palette changer (APC) in order to minimize the non-processing time. The automatic palette changer (APC) automatically changes the palettes between a workpiece machining region and a workpiece loading region. The workpiece may be mounted on the palette.

Further, the machine tools are generally classified broadly into a turning center and a machining center depending on machining methods. The turning center is provided with a turret tool post used to mount a plurality of tools and index the tools required for the machining process.

As illustrated in FIGS. 1 and 2, a turret tool post for a machine tool generally receives a plurality of tools in order to smoothly machine a workpiece and improve productivity.

As illustrated in FIG. 1, in the turret tool post for a machine tool in the related art, an optional unit 3, such as a gripper for receiving a workpiece 2 as well as the tools, may be attached to or detached from a turret 8.

Further, as illustrated in FIG. 2, the optional unit 3 such as a steady rest may be mounted on a turret tool post for a machine tool in the related art which is provided with a dual turret tool post.

That is, as illustrated in FIG. 2, in the case of the first turret 8 of a first tool post 6, the workpiece 2 is fastened to a chuck 4, and the workpiece 2 is machined by a tool 5 mounted on the first turret 8. In this case, in order to compensate for rattling of the workpiece 2 caused by vibration or to support the workpiece 2, the machining process may be performed in a state in which the optional unit 3, such as a steady rest, is mounted on a second turret 9 of a second tool post 7.

As described above, flexibility is required for a turret tool post in the related art in a case in which a small number of various types of products are manufactured rather than a case in which a large number of products are manufactured.

However, in the case of the turret tool post for a machine tool in the related art, in order to supply pneumatic or hydraulic pressure for operating the optional unit, a complicated device needs to be additionally mounted inside the turret tool post or a separate device needs to be additionally installed outside the turret tool post in a severe case in which the separate device cannot be mounted inside the turret tool post. As a result, there is a problem in that a reduction in size of the turret tool post for a machine tool cannot be achieved.

Further, in the case of the turret tool post for a machine tool in the related art, the optional unit needs to be removed when the optional unit is not used after the operation of the optional unit is finished, and as a result, there is a problem in that non-machining time is increased and productivity deteriorates.

In addition, in the case of the turret tool post for a machine tool in the related art, an operator needs to manually remove the optional unit and a pressure supply part configured to supply the optional unit with operating pressure, and as a result, there is a problem in that the operator is inconvenienced and machining costs are increased.

Moreover, in the case of the turret tool post for a machine tool in the related art, there is a case in which the device configured to supply pneumatic or hydraulic pressure for operating the optional unit cannot be installed separately, and as a result, there is a problem in that flexibility of the turret tool post is not satisfied, which causes consumer complaint and a significant deterioration in machining precision or the like.

DISCLOSURE

Summary

The present disclosure has been made in an effort to solve the above-mentioned problems, and an object of the present disclosure is to provide a turret tool post for a machine tool, wherein a rotary unit is mounted on a turret so as to be rotated along with a rotation of the turret, a fixing unit is installed on a tool post body, and the fixing unit and the rotary unit are clamped or unclamped by a rotation of the rotary unit and a forward or rearward movement of a cylinder which is moved forward or rearward in a cylinder block of the fixing unit by pressure, such that a supply of pneumatic or hydraulic pressure required to operate an optional unit detachably installed on the rotary unit is allowed or cut off, thereby improving productivity of a machine tool and preventing inconvenience of removing the optional unit when the optional unit is not used.

In order to achieve the above-mentioned object of the present disclosure, a turret tool post for a machine tool according to the present disclosure may include: a tool post body; a turret installed on the tool post body and configured to receive a plurality of tools; a drive unit installed on the tool post body and configured to provide rotational power to the turret; a rotary unit installed on a part of the turret so as to be rotated together with the turret and coupled to an optional unit; and a fixing unit installed on the tool post body and configured to be clamped with or unclamped from the rotary unit by a rotation of the rotary unit in order to allow or cut off a supply of pressure required for an operation of the optional unit.

Further, according to another exemplary embodiment of the turret tool post for a machine tool according to the present disclosure, the rotary unit of the turret tool post for a machine tool may include: a base part fastened to the turret; and a main body part provided at one side of the base part and to which the optional unit is detachably coupled.

In addition, according to still another exemplary embodiment of the turret tool post for a machine tool according to the present disclosure, the main body part of the rotary unit of the turret tool post for a machine tool may include a first flow path penetratively formed in the main body part; a first fitting part protruding from a front side of the main body part so as to communicate with one end of the first flow path and connected to the optional unit; and a first coupling formed at a rear side of the main body part so as to communicate with the other end of the first flow path.

Further, according to yet another exemplary embodiment of the turret tool post for a machine tool according to the present disclosure, the fixing unit of the turret tool post for a machine tool may include: a housing part installed on the tool post body; a clamping part formed at a front side of the housing part and configured to be clamped with or unclamped from the main body part by a rotation of the turret and a forward or rearward movement of the housing part; and a pressure supply part formed at a rear side of the housing part and having a hydraulic pressure supply part for supplying hydraulic pressure to the optional unit, and a pneumatic pressure supply part for supplying pneumatic pressure.

In addition, according to still yet another exemplary embodiment of the turret tool post for a machine tool according to the present disclosure, the housing part of the turret tool post for a machine tool may include: a cylinder having a first fluid inlet groove and a second fluid inlet groove in the housing part and configured to move forward or rearward toward the main body part; a cylinder block configured to surround the cylinder and having a forward pressure supply part for supplying pressure to move the cylinder forward, and a rearward pressure supply part for supplying pressure to move the cylinder rearward; and a third flow path penetratively formed in the housing part.

Further, according to a further exemplary embodiment of the turret tool post for a machine tool according to the present disclosure, the clamping part of the turret tool post for a machine tool may include: a third coupling connected to one end of the third flow path and configured to be clamped with or unclamped from the first coupling by the rotation of the rotary unit and a forward or rearward movement of the cylinder to allow the first flow path and the third flow path to communicate with each other or to block the communication between the first flow path and the third flow path.

In addition, according to another further exemplary embodiment of the turret tool post for a machine tool according to the present disclosure, the main body part of the rotary unit of the turret tool post for a machine tool may further include: a second flow path spaced apart from the first flow path and penetratively formed in the main body part; a second fitting part protruding from a front side of the main body part so as to communicate with one end of the second flow path and connected to the optional unit; and a second coupling formed at a rear side of the main body part so as to communicate with the other end of the second flow path, the housing part of the fixing unit may further include a fourth flow path spaced apart from the third flow path and penetratively formed in the housing part, and the clamping part of the fixing unit may further include a fourth coupling connected to one end of the fourth flow path and configured to be clamped with or unclamped from the second coupling by the rotation of the rotary unit and the forward or rearward movement of the cylinder to allow the second flow path and the fourth flow path to communicate with each other or to block the communication between the second flow path and the fourth flow path.

Further, according to still another further exemplary embodiment of the turret tool post for a machine tool according to the present disclosure, the first coupling and the second coupling of the main body part of the rotary unit of the turret tool post for a machine tool may further include elastic members, respectively, for sealing the first coupling and the second coupling when the first coupling and the third coupling are unclamped and the second coupling and the fourth coupling are unclamped as the cylinder moves rearward.

In addition, according to the turret tool post for a machine tool according to the present disclosure, the rotary unit is mounted on the turret so as to be rotated along with the rotation of the turret, the fixing unit is installed on the tool post body, and the fixing unit and the rotary unit are clamped or unclamped by the rotation of the rotary unit and the forward or rearward movement of the cylinder which is moved forward or rearward in the cylinder block of the fixing unit by pressure, such that the supply of the pneumatic or hydraulic pressure required to operate the optional unit detachably installed on the rotary unit is allowed or cut off, thereby achieving convenience for an operator and preventing inconvenience of removing the optional unit when the optional unit is not used.

Further, according to the turret tool post for a machine tool according to the present disclosure, the rotary unit and the fixing unit are clamped or unclamped by the rotation of the rotary unit and the forward or rearward movement of the cylinder of the fixing unit, the pneumatic or hydraulic pressure required for the optional unit is easily transmitted, and thus a separate device need not be mounted inside and outside the turret tool post, thereby achieving a reduction in size of the turret tool post for a machine tool and finally making the machine tool compact.

In addition, according to the turret tool post for a machine tool according to the present disclosure, the operator need not manually remove the optional unit after using the optional unit, thereby achieving convenience for the operator. The optional unit may be released by the simple operation of rotating the rotary unit and moving the cylinder of the fixing unit rearward, and then the machining process may be performed immediately, thereby improving productivity and minimizing machining costs by minimizing non-machining time.

Further, according to the turret tool post for a machine tool according to the present disclosure, a device for supplying pneumatic or hydraulic pressure need not be separately installed, and thus the optional unit may be mounted on all turret tool posts and easily used, such that flexibility of the turret tool post is satisfied, thereby improving consumer satisfaction and improving machining precision and reliability of the machine tool by using various optional units.

DESCRIPTION OF MAIN REFERENCE NUMERALS OF DRAWINGS

Figure 1:
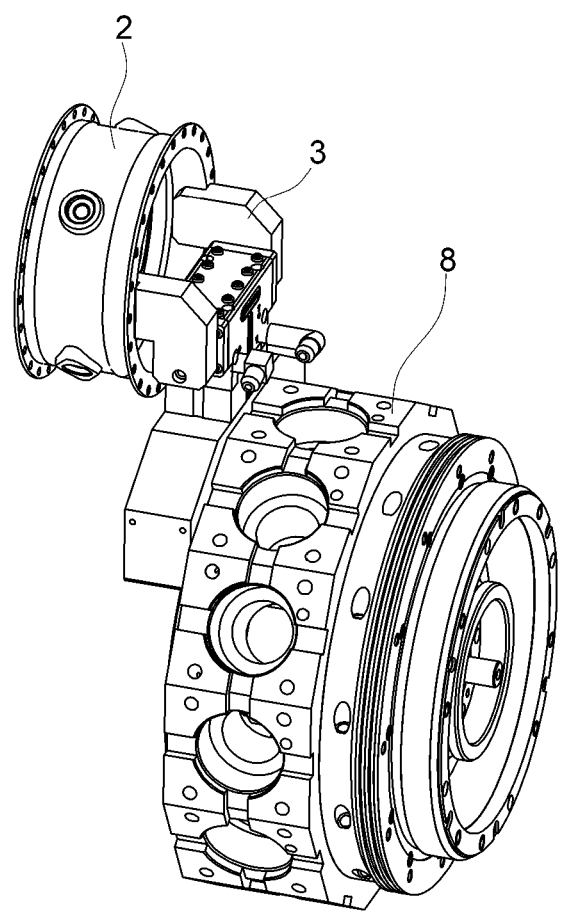
FIG. 1 is a conceptual view illustrating a state in which an optional unit is used for a turret tool post in the related art.
Figure 2:
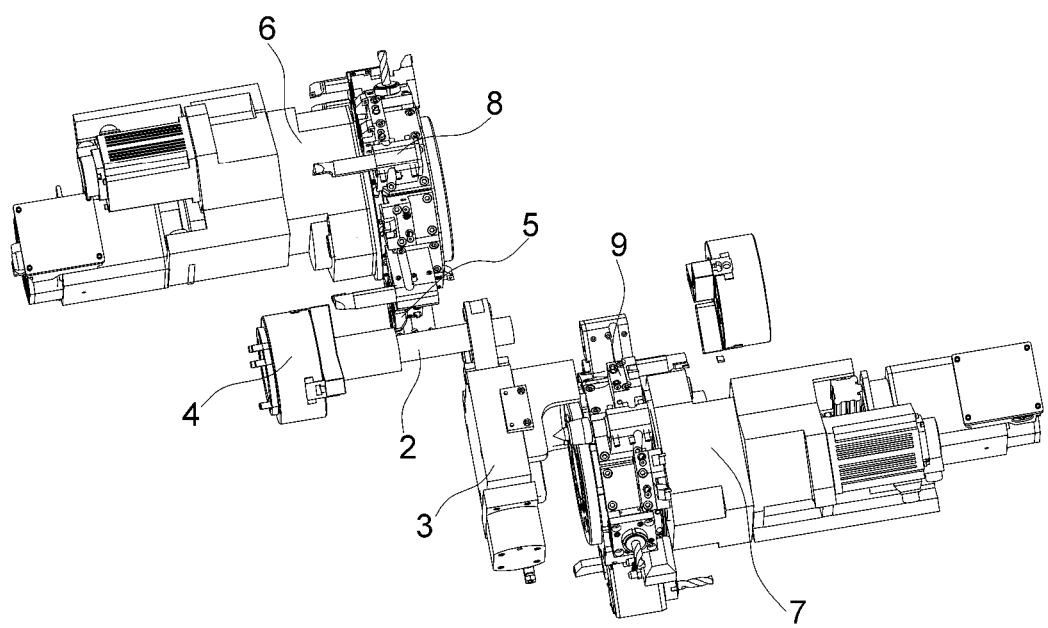
FIG. 2 is a conceptual view illustrating a state in which an optional unit is used for a dual turret tool post in the related art.

1: Turret tool post
2: Workpiece
3: Optional unit
4: Chuck
5: Tool
6: First tool post
7: Second tool post
8: First turret
9: Second turret
1000: Tool post body
2000: Turret
3000: Drive unit
4000: Rotary unit
4100: Base part
4200: Main body part
4210: First flow path
4220: First fitting part
4230: First coupling
4240: Second flow path
4250: Second fitting part
4260: Second coupling
4270: Elastic member
5000: Fixing unit
5100: Housing part
5110: Cylinder
5111: First fluid inlet groove
5112: Second fluid inlet groove
5120: Cylinder block
5121: Forward pressure supply part
5122: Rearward pressure supply part
5130: Third flow path
5140: Fourth flow path
5200: Clamping part
5210: Third coupling
5220: Fourth coupling
5230: Guide part
5300: Pressure supply part
5310: Hydraulic pressure supply part
5320: Pneumatic pressure supply part

DETAILED DESCRIPTION OF CERTAIN INVENTIVE EMBODIMENT

Hereinafter, a turret tool post for a machine tool according to an exemplary embodiment of the present disclosure will be described in detail with reference to the drawings. The following exemplary embodiments are provided as examples for fully transferring the spirit of the present disclosure to those skilled in the art. Therefore, the present disclosure is not limited to the exemplary embodiments described below and may be specified as other aspects. Further, in the drawings, a size and a thickness of the apparatus may be exaggerated for convenience. Like reference numerals indicate like constituent elements throughout the specification.

Advantages and features of the present disclosure and methods of achieving the advantages and features will be clear with reference to exemplary embodiments described in detail below together with the accompanying drawings. However, the present disclosure is not limited to the exemplary embodiments disclosed herein but will be implemented in various forms. The exemplary embodiments of the present disclosure are provided so that the present disclosure is completely disclosed, and a person with ordinary skill in the art can fully understand the scope of the present disclosure. The present disclosure will be defined only by the scope of the appended claims. Like reference numerals indicate like constituent elements throughout the specification. In the drawings, sizes and relative sizes of layers and regions may be exaggerated for clarity of description.

The terms used in the present specification are for explaining the exemplary embodiments, not for limiting the present disclosure. Unless particularly stated otherwise in the present specification, a singular form also includes a plural form. The terms such as "comprise (include)" and/or "comprising (including)" used in the specification do not exclude presence or addition of one or more other constituent elements, steps, operations, and/or elements, in addition to the mentioned constituent elements, steps, operations, and/or elements.

Figure 3:
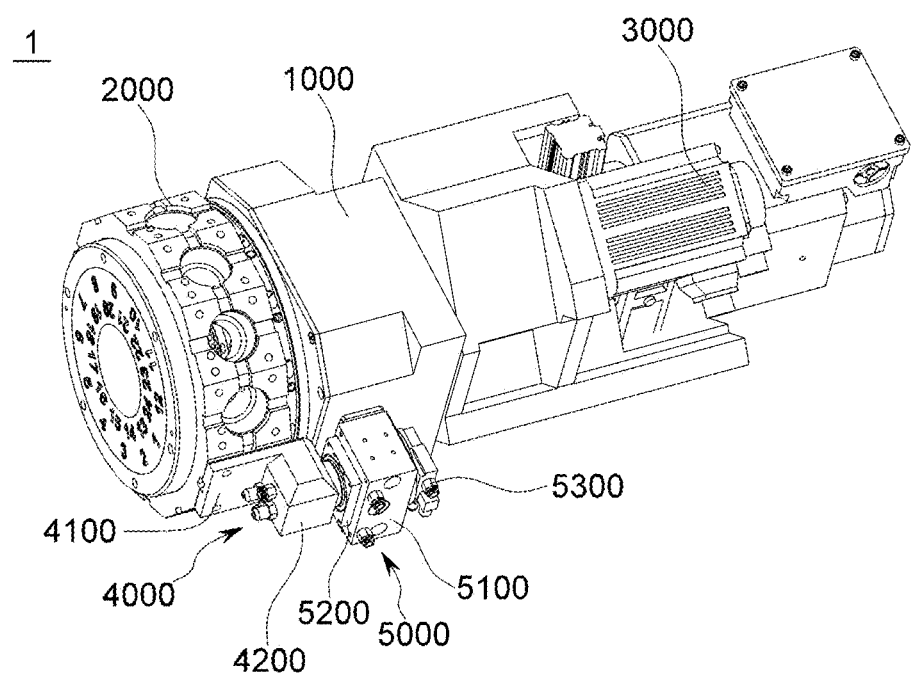
FIG. 3 is a perspective view illustrating a state in which a rotary unit and a fixing unit of a turret tool post for a machine tool according to the present disclosure are clamped.
Figure 4:
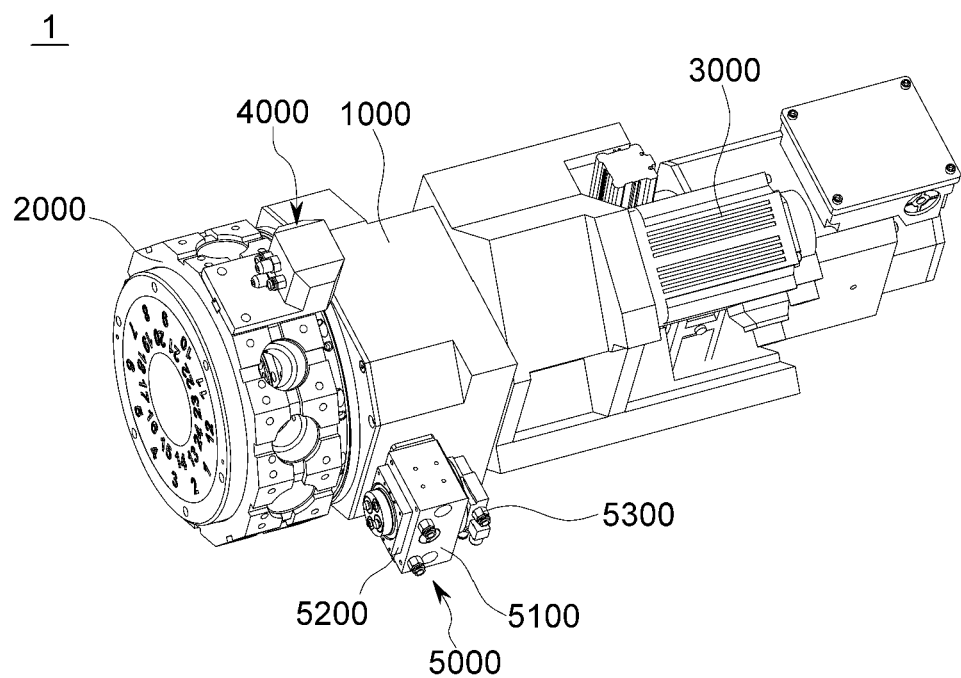
FIG. 4 is a perspective view illustrating a state in which the rotary unit and the fixing unit of the turret tool post for a machine tool according to the present disclosure are unclamped.
Figure 5:
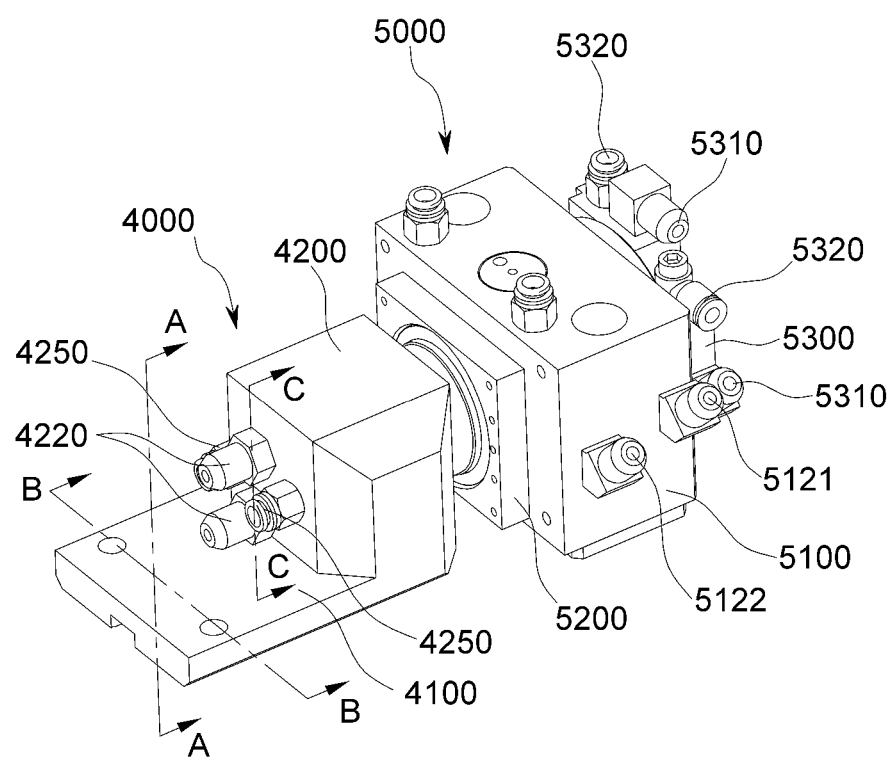
FIG. 5 is a perspective view illustrating the rotary unit and the fixing unit of the turret tool post for a machine tool according to an exemplary embodiment of the present disclosure.
Figure 6:
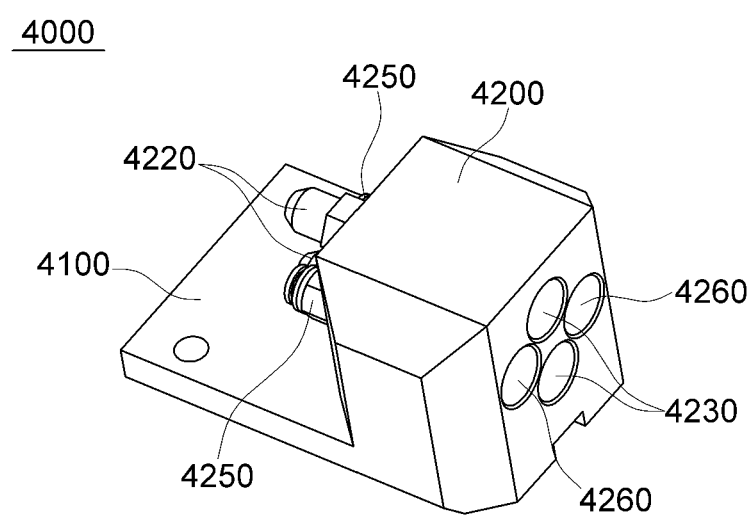
FIG. 6 is a rear perspective view illustrating the rotary unit of the turret tool post for a machine tool according to the exemplary embodiment of the present disclosure.
Figure 7:
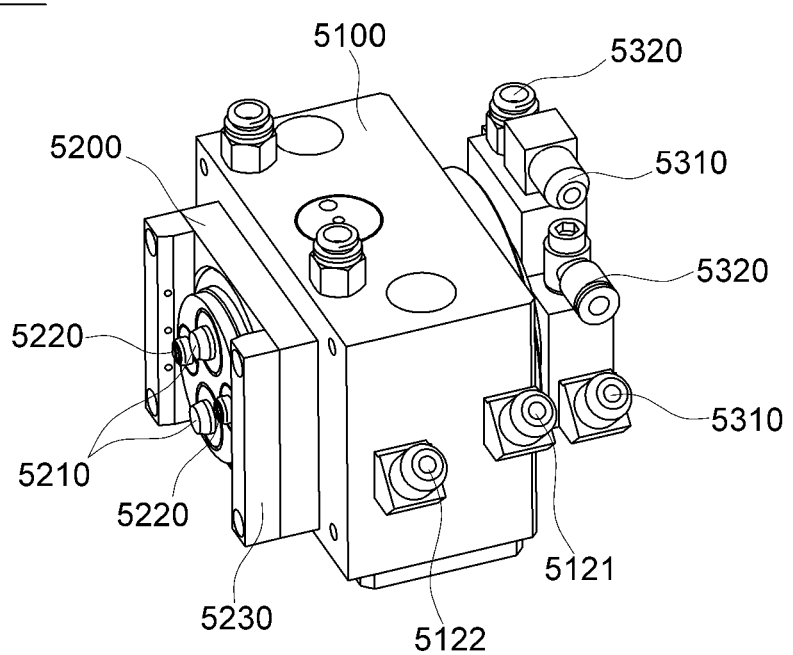
FIG. 7 is a perspective view illustrating the fixing unit of the turret tool post for a machine tool according to the exemplary embodiment of the present disclosure.
Figure 8:
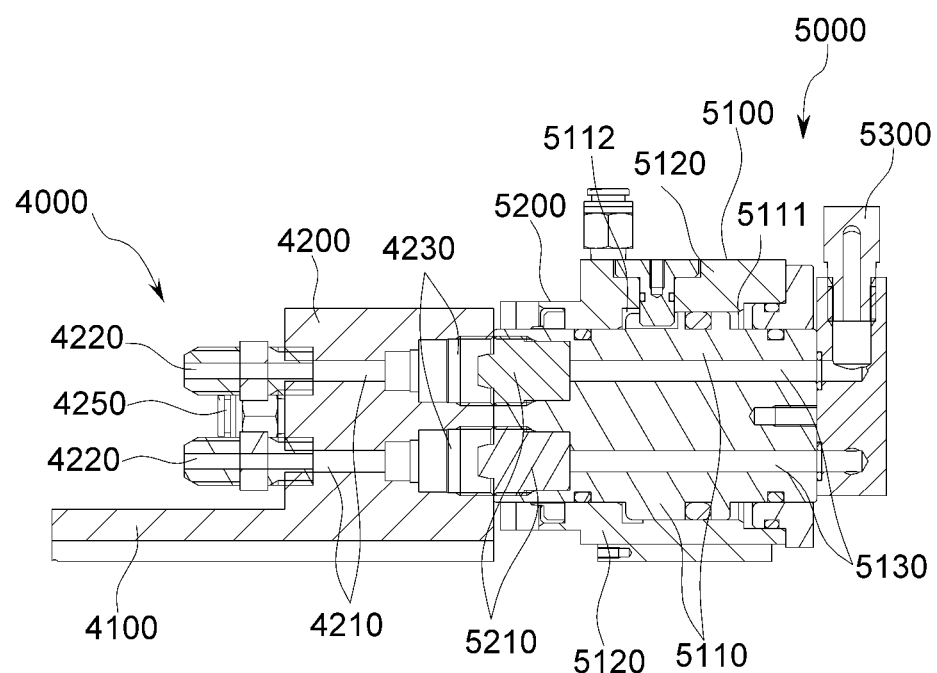
FIG. 8 is a cross-sectional view taken along line A-A in FIG. 5 and illustrating a state in which the rotary unit and the fixing unit of the turret tool post for a machine tool according to the exemplary embodiment of the present disclosure are clamped.
Figure 9:
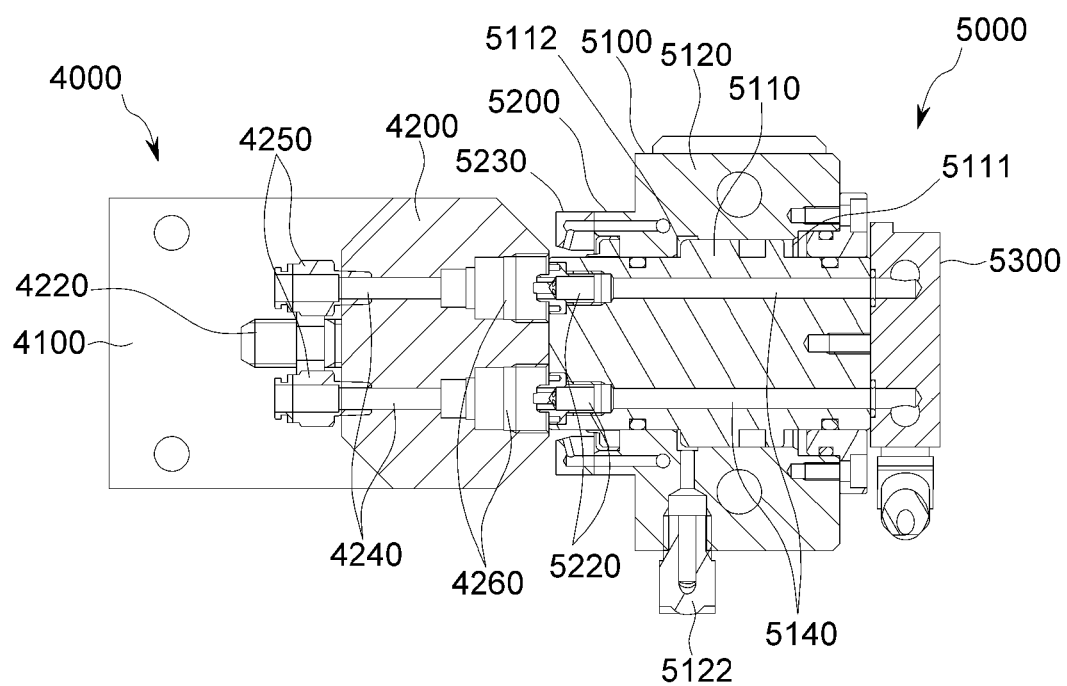
FIG. 9 is a cross-sectional view taken along line B-B in FIG. 5 and illustrating a state in which the rotary unit and the fixing unit of the turret tool post for a machine tool according to the exemplary embodiment of the present disclosure are clamped.
Figure 10:
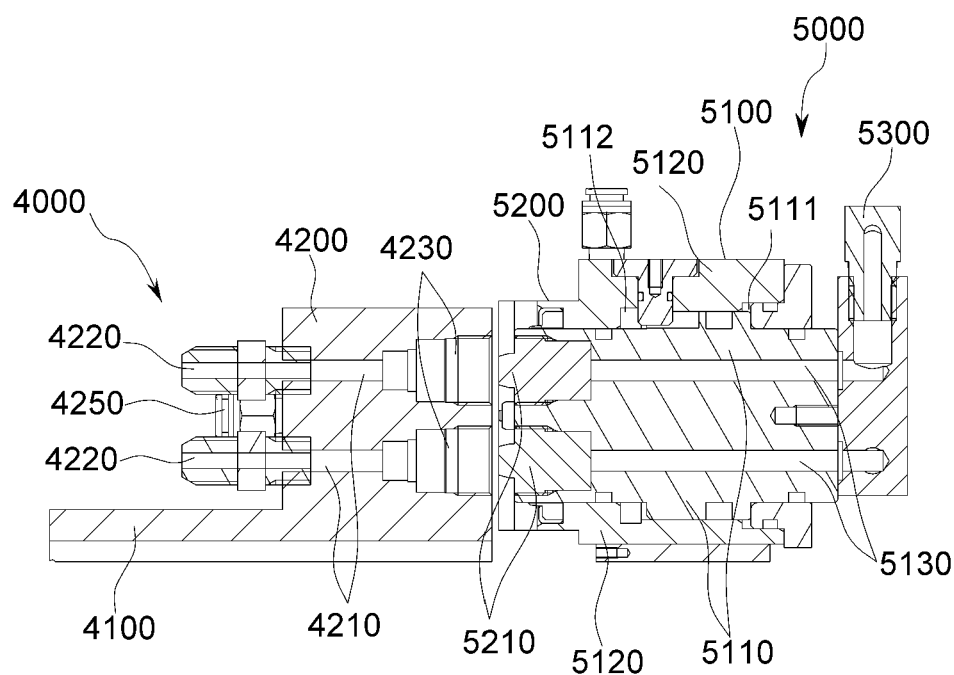
FIG. 10 is a cross-sectional view taken along line A-A in FIG. 5 and illustrating a state in which the rotary unit and the fixing unit of the turret tool post for a machine tool according to the exemplary embodiment of the present disclosure are unclamped.
Figure 11:
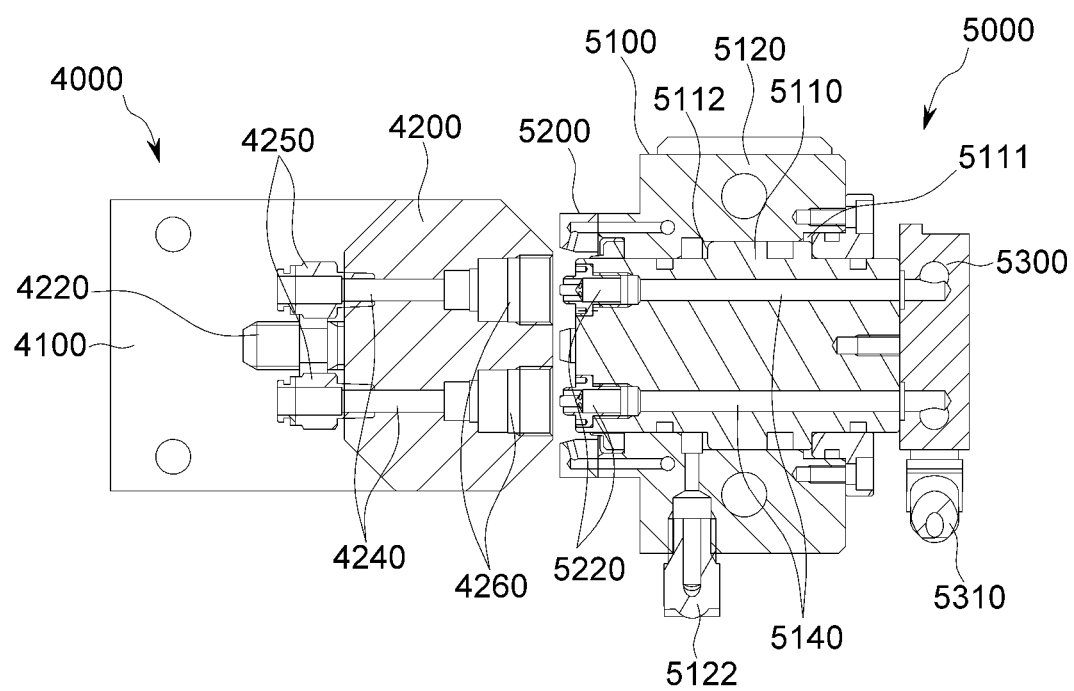
FIG. 11 is a cross-sectional view taken along line B-B in FIG. 5 and illustrating a state in which the rotary unit and the fixing unit of the turret tool post for a machine tool according to the exemplary embodiment of the present disclosure are unclamped.
Figure 12:
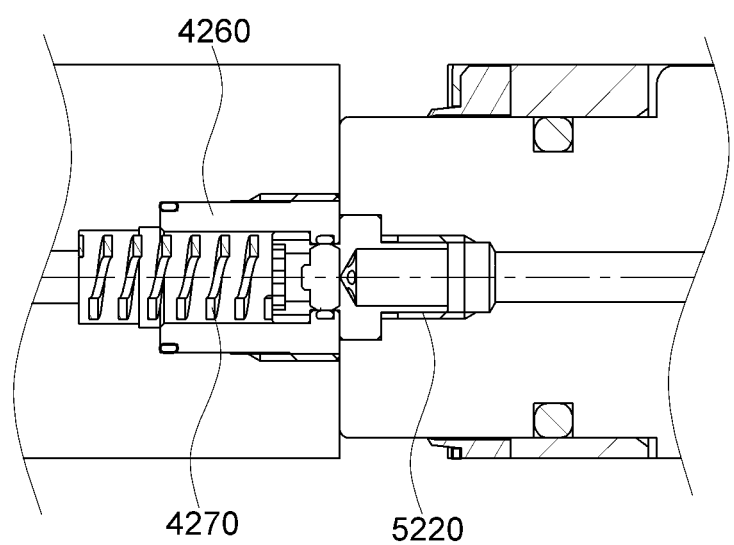
FIG. 12 is a partially cross-sectional view taken along line C-C in FIG. 5 and illustrating a state in which the rotary unit and the fixing unit of the turret tool post for a machine tool according to the exemplary embodiment of the present disclosure are unclamped.

FIG. 3 is a perspective view illustrating a state in which a rotary unit and a fixing unit of a turret tool post for a machine tool according to the present disclosure are clamped, and FIG. 4 is a perspective view illustrating a state in which the rotary unit and the fixing unit of the turret tool post for a machine tool according to the present disclosure are unclamped. FIG. 5 is a perspective view illustrating the rotary unit and the fixing unit of the turret tool post for a machine tool according to an exemplary embodiment of the present disclosure, FIG. 6 is a rear perspective view illustrating the rotary unit of the turret tool post for a machine tool according to the exemplary embodiment of the present disclosure, and FIG. 7 is a perspective view illustrating the fixing unit of the turret tool post for a machine tool according to the exemplary embodiment of the present disclosure. FIG. 8 is a cross-sectional view taken along line A-A in FIG. 5 and illustrating a state in which the rotary unit and the fixing unit of the turret tool post for a machine tool according to the exemplary embodiment of the present disclosure are clamped, and FIG. 9 is a cross-sectional view taken along line B-B in FIG. 5 and illustrating a state in which the rotary unit and the fixing unit of the turret tool post for a machine tool according to the exemplary embodiment of the present disclosure are clamped. FIG. 10 is a cross-sectional view taken along line A-A in FIG. 5 and illustrating a state in which the rotary unit and the fixing unit of the turret tool post for a machine tool according to the exemplary embodiment of the present disclosure are unclamped, and FIG. 11 is a cross-sectional view taken along line B-B in FIG. 5 and illustrating a state in which the rotary unit and the fixing unit of the turret tool post for a machine tool according to the exemplary embodiment of the present disclosure are unclamped. FIG. 12 is a partially cross-sectional view taken along line C-C in FIG. 5 and illustrating a state in which the rotary unit and the fixing unit of the turret tool post for a machine tool according to the exemplary embodiment of the present disclosure are unclamped.

The terms used below are defined as follows. The term "forward" means a direction close to a workpiece with respect to the same member, and the term "rearward" means a direction distant from the workpiece with respect to the same member. That is, the term "forward" means a left direction in FIGS. 3 to 12, and the term "rearward" means a right direction in FIGS. 3 to 12. The term "vertical direction" means a vertical direction in the same member orthogonal to the horizontal direction, and the term "width direction" means a height direction in the same member orthogonal to the horizontal direction and the vertical direction. The term "one end" means an end at one side of the same member, and the term "the other end" means a portion of the same member, which is opposite to "one end", that is, an end at the other side of the same member.

A turret tool post 1 for a machine tool according to an exemplary embodiment of the present disclosure will be described with reference to FIGS. 3 and 4. As illustrated in FIGS. 3 and 4, the turret tool post 1 for a machine tool according to the exemplary embodiment of the present disclosure includes a tool post body 1000, a turret 2000, a drive unit 3000, a rotary unit 4000, and a fixing unit 5000.

The tool post body 1000 is installed on a part of a body of a machine tool which is not illustrated in the drawings.

The turret 2000 is installed on the tool post body 1000 and receives a plurality of tools 5. The turret 2000 may receive various tools including a cutting tool required to machine the workpiece 2 of the machine tool, tools used to perform outer diameter turning and inner diameter turning, and tools required for drilling or milling.

The drive unit 3000 is installed on the tool post body 1000 and provides rotational power to the turret 2000. The drive unit 3000 selectively provides rotational power to the turret 2000 in order to rotate the turret 2000 so that the desired tool, among the plurality of tools received by the turret, may be used to machine the workpiece. The drive unit 3000 may be configured as, but not necessarily limited to, a servo motor. In addition, the drive unit 3000 is operated based on an instruction of a PLC or a numerical control unit.

Further, the numerical control unit includes numerical control (NC) or computerized numerical control (CNC) and is embedded with various types of numerical control programs. That is, the numerical control unit is embedded with a program for operating the servo motor which is the drive unit and a program for operating the tools, and the corresponding program is automatically loaded and executed based on the operation of the numerical control unit. In addition, the numerical control unit communicates with a main operating unit and the PLC through a predetermined protocol.

In addition, the main operating unit includes a screen display program and a data input program in accordance with a selection of a screen display and performs a function of displaying a software switch on a display screen in accordance with an output of the screen display program and a function of recognizing an ON/OFF state of the software switch and making an instruction about an input and an output for an operation of the machine.

Further, the main operating unit has a monitor installed in or at one side of a housing or a casing of the machine tool and capable of displaying multifunctional switches or buttons and various types of information, but the present invention is not necessarily limited thereto.

The PLC (programmable logic controller) communicates with the numerical control unit or the main operating unit through the predetermined protocol and serves to make a control instruction through this communication. That is, the PLC operates by receiving a control instruction based on the numerical control program for the numerical control unit or the main operating unit.

The rotary unit 4000 is installed on a part of the turret 2000 so as to rotate together with the turret 2000, and an optional unit 3 is detachably coupled to the rotary unit 4000.

Further, although not illustrated in the drawings, as necessary, a plurality of rotary units 4000 may be installed on a part of the turret 2000 so as to rotate together with the turret 2000.

In addition, although not illustrated in the drawings, based on a central axis of the turret 2000, in holes in which the tools 5 are received, two rotary units 4000 may be disposed at an angle of 180 degrees, three rotary units 4000 may be disposed at an angle of 120 degrees, four rotary units 4000 may be disposed at an angle of 90 degrees, or five rotary units 4000 may be disposed at an angle of 72 degrees, such that the rotary units 4000 may be smoothly operated without mechanical interference between the optional units 3 in a case in which a plurality of fixing units 5000 to be described below is installed.

The fixing unit 5000 is fixedly installed on a part of the tool post body 1000. The fixing unit 5000 and the rotary unit 4000 are clamped or unclamped by the rotation of the rotary unit 4000 and a forward or rearward movement of a cylinder to be described below, thereby allowing or cutting off a supply of pressure such as hydraulic or pneumatic pressure required to operate the optional unit 3.

That is, in a case in which the optional unit needs to be mounted and used as illustrated in FIG. 3, the turret 2000 is rotated by the operation of the drive unit 3000, and the rotary unit 4000 is rotated by the rotation of the turret 2000. Thereafter, when the rotary unit 4000 rotates and thus the rotary unit 4000 and the fixing unit 5000 face each other, the cylinder is moved forward, by hydraulic pressure, in a cylinder block of the fixing unit 5000 which will be described below, and thus the fixing unit and the rotary unit are clamped, such that in this clamped state, a pressure supply part of the fixing unit, which will be described below, supplies hydraulic or pneumatic pressure required for the optional unit.

When the optional unit is not used and thus the optional unit needs to be detached as illustrated in FIG. 4, the turret 2000 is rotated by the operation of the drive unit 3000, and the rotary unit 4000 is rotated by the rotation of the turret 2000. Thereafter, when the rotary unit 4000 rotates and thus the rotary unit 4000 and the fixing unit 5000 do not face each other, the cylinder is moved rearward, by hydraulic pressure, in the cylinder block of the fixing unit 5000 which will be described below, and thus the fixing unit and the rotary unit are unclamped, such that in this unclamped state, the pressure supply part of the fixing unit, which will be described below, cuts off the supply of the hydraulic or pneumatic pressure required for the optional unit.

Further, although not illustrated in the drawings, as necessary, the fixing unit 5000 may be fixedly installed on a part of the tool post body 1000 so that the number of fixing units 5000 corresponds to the number of installed rotary units 4000.

In a case in which the plurality of fixing units 5000 is installed, two fixing units 5000 may be installed at an angle of 180 degrees, three fixing units 5000 may be installed at an angle of 120 degrees, four fixing units 5000 may be installed at an angle of 90 degrees, or five fixing units 5000 may be installed at an angle of 72 degree on a part of the tool post body 1000 based on the central axis of the tool post body 1000 so as to correspond to the rotary unit 4000. However, in the case in which the fixing unit 5000 is installed on the tool post body 1000, the number of fixing units 5000 may be smaller by one or more than the number of rotary units 4000 in order to prevent the interference in the state in which the optional unit 3 is coupled to the rotary unit 4000.

Therefore, according to the turret tool post for a machine tool according to the present disclosure, the rotary unit is mounted on the turret so as to be rotated along with the rotation of the turret, the fixing unit is fixedly installed on the tool post body, and the fixing unit and the rotary unit are clamped or unclamped by the rotation of the rotary unit and the forward or rearward movement of the cylinder which is moved forward or rearward in the cylinder block of the fixing unit by pressure, such that the supply of the pneumatic or hydraulic pressure required to operate the optional unit detachably installed on the rotary unit is allowed or cut off, thereby improving convenience of an operator and preventing inconvenience of removing the optional unit when the optional unit is not used.

As illustrated in FIGS. 5 and 6, the rotary unit 4000 of the turret tool post 1 for a machine tool according to the exemplary embodiment of the present disclosure includes a base part 4100 and a main body part 4200.

The base part 4100 is fastened to the turret 2000 by a well-known fastening means such as a bolt or a rivet. The base part 4100 is formed in the form of, but not necessarily limited to, a plate having a size corresponding to one divided angle of the turret.

The main body part 4200 is formed at one side of the base part 4100. The optional unit is detachably coupled to the main body part 4200. The main body part 4200 protrudes outward from one end of the base part 4100. That is, at one end of the base part 4100 adjacent to the tool post body 1000, the main body part 4200 protrudes outward from the base part 4100 in a direction toward an outer circumferential surface of the turret 2000. In addition, the main body part 4200 is formed in a hollow shape.

The base part 4100 and the main body part 4200 are integrally formed to reduce manufacturing costs and manufacturing time, but the present disclosure is not necessarily limited thereto.

As illustrated in FIGS. 5 to 11, the main body part 4200 of the rotary unit 4000 of the turret tool post 1 for a machine tool according to the exemplary embodiment of the present disclosure includes first flow paths 4210, first fitting parts 4220, and first couplings 4230. In addition, as illustrated in FIGS. 5 to 11, the main body part 4200 of the rotary unit 4000 of the turret tool post 1 for a machine tool according to another exemplary embodiment of the present disclosure further includes second flow paths 4240, second fitting parts 4250, and second couplings 4260.

The first flow path 4210 is penetratively formed in the main body part 4200. Hydraulic pressure supplied from a hydraulic pressure supply part 5310 of a pressure supply part 5300, which will be described below, flows in the first flow path 4210, and the pair of first flow paths 4210 is formed to supply the hydraulic pressure and recover the hydraulic pressure.

The first fitting part 4220 protrudes from a front side of the main body part 4200 so as to communicate with one end of the first flow path 4210. The first fitting part 4220 is connected to the optional unit to supply the hydraulic pressure to the optional unit or recover the hydraulic pressure.

The first coupling 4230 is formed at a rear side of the main body part 4200 so as to communicate with the other end of the first flow path 4210. Therefore, the first coupling 4230 and a third coupling 5210 to be described below are clamped or unclamped to supply the hydraulic pressure to the first flow path 4210 or recover the hydraulic pressure.

The second flow path 4240 is spaced apart from the first flow path 4210 and penetratively formed in the main body part 4200. In addition, pneumatic pressure supplied from a pneumatic pressure supply part 5320 of the pressure supply part 5300, which will be described below, flows in the second flow path 4240, and the pair of second flow paths 4240 is formed to supply and recover the pneumatic pressure. The first flow path 4210 and the second flow path 4240 are formed in the main body part 4200 so as to be orthogonal to each other based on a center of the main body part, but the present disclosure is not necessarily limited thereto. That is, the first flow path 4210 and the second flow path 4240 are penetratively formed in the main body part 4200 so as to disposed at an angle of 90 degrees with respect to each other.

The second fitting part 4250 protrudes from the front side of the main body part 4200 so as to communicate with one end of the second flow path 4240. The second fitting part 4250 is connected to the optional unit to supply the pneumatic pressure to the optional unit and recover the pneumatic pressure. The second fitting part 4250 and the first fitting part 4220 are also formed to be orthogonal to each other based on the center of the main body part.

The second coupling 4260 is formed at the rear side of the main body part 4200 so as to communicate with the other end of the second flow path 4240. Therefore, the second coupling 4260 and a fourth coupling 5220 to be described below are clamped or unclamped to supply the pneumatic pressure to the second flow path 4210 or recover the pneumatic pressure. The second coupling 4260 and the first coupling 4230 are also formed to be orthogonal to each other based on the center of the main body part.

Therefore, a size of the main body part is reduced, and the first flow path, the second flow path, the first fitting part, the second fitting part, the first coupling, and the second coupling are most compactly formed in the main body part, thereby reducing a size of the turret tool post for a machine tool.

Although not illustrated in the drawings, in a state in which the optional unit 3 is coupled to the rotary unit 4000, the hydraulic pressure is supplied to the optional unit 3 through the first fitting part 4220, and thus the optional unit 3 is operated by the hydraulic pressure. In addition, in the state in which the optional unit 3 is coupled to the rotary unit 4000, the pneumatic pressure is supplied to the optional unit 30 through the second fitting part 4250, and thus the optional unit 3 is operated by the pneumatic pressure. As described above, the hydraulic or pneumatic pressure is selectively supplied to the optional unit 3 selectively by the first fitting part 4220 and the second fitting part 4250, thereby achieving a smooth operation of the optional unit 3, reducing a size of the turret tool post, and maximizing user's convenience.

As illustrated in FIGS. 3 to 7, the fixing unit 5000 of the turret tool post 1 for a machine tool according to the exemplary embodiment of the present disclosure includes a housing part 5100, a clamping part 5200, and the pressure supply part 5300.

The housing part 5100 is fixedly installed on the tool post body 1000 by a well-known fastening means such as a bolt or a rivet. The housing part 5100 is formed in a hollow shape.

The clamping part 5200 is provided at a front side of the housing part 5100, and the clamping part 5200 and the main body part 4200 are clamped or unclamped by the rotation of the turret 2000 and the forward or rearward movement of the cylinder 5110 of the housing part 5100.

The pressure supply part 5300 is provided at a rear side of the housing part 5100 and includes the hydraulic pressure supply part 5310 configured to supply the hydraulic pressure to the optional unit, and the pneumatic pressure supply part 5320 configured to supply the pneumatic pressure. Although not illustrated in the drawings, the hydraulic pressure supply part 5310 is connected to a hydraulic pressure supply source through a hose or the like, and the pneumatic pressure supply part 5320 is connected to a pneumatic pressure supply source through a hose or the like, thereby supplying or recovering the hydraulic pressure and the pneumatic pressure.

As illustrated in FIGS. 5 to 11, the housing part 5100 of the fixing unit 5000 of the turret tool post 1 for a machine tool according to the exemplary embodiment of the present disclosure includes the cylinder 5110, the cylinder block 5120, and third flow paths 5130. In addition, as illustrated in FIGS. 5 to 11, the housing part 5100 of the fixing unit 5000 of the turret tool post 1 for a machine tool according to another exemplary embodiment of the present disclosure further includes fourth flow paths 5140.

The cylinder 5110 has a first fluid inlet groove 5111 and a second fluid inlet groove 5112 provided in the housing part 5100. The cylinder 5110 is formed in a hollow shape so that the third flow path 5130 and the fourth flow path 5140 are formed in the cylinder 5110. When the hydraulic pressure is supplied by a forward pressure supply part 5121 of the cylinder block 5120 to be described below, the hydraulic pressure in the first fluid inlet groove 5111 is increased, such that the cylinder 5110 moves forward toward the main body part 4200. When the hydraulic pressure is supplied by a rearward pressure supply part 5122 of the cylinder block 5120, the hydraulic pressure in the second fluid inlet groove 5112 is increased, such that the cylinder 5110 moves rearward toward the main body part 4200.

The cylinder block 5120 is formed to surround the cylinder 5110. The cylinder block 5120 defines an external shape of the housing part 5100, and the cylinder block 5120 is formed in a hollow shape. Outside the cylinder block 5120, the forward pressure supply part 5121 is provided to supply the hydraulic pressure for moving the cylinder 5110 forward, and the rearward pressure supply part 5122 is provided to supply the hydraulic pressure for moving the cylinder 5110 rearward. The forward pressure supply part 5121 and the rearward pressure supply part 5122 are installed outside the cylinder block 5120 so as to face each other, but the present disclosure is not necessarily limited thereto.

The third flow path 5130 is penetratively formed in the housing part 5100. The hydraulic pressure supplied from the hydraulic pressure supply part 5310 of the pressure supply part 5300 flows in the third flow path 5130, and the pair of third flow paths 5130 is formed to supply and recover the hydraulic pressure.

The fourth flow path 5140 is spaced apart from the third flow path 5130 and penetratively formed in the housing part 5100. In addition, the pneumatic pressure supplied from the pneumatic pressure supply part 5320 of the pressure supply part 5300 flows in the fourth flow path 5140, and the pair of fourth flow paths 5140 is formed to supply and recover the pneumatic pressure. The third flow path 5130 and the fourth flow path 5140 are formed in the housing part 5100 so as to be orthogonal to each other based on a center of the housing part, but the present disclosure is not necessarily limited thereto. That is, the third flow path 5130 and the fourth flow path 5140 are penetratively formed in the housing part 5100 so as to be disposed at an angle of 90 degrees with respect to each other.

Therefore, a size of the housing part is reduced, and the second flow path, the fourth flow path, the forward pressure supply part, the rearward pressure supply part, the cylinder, and the cylinder block are mostly compactly formed inside and outside the housing part, thereby reducing a size of the turret tool post for a machine tool.

As illustrated in FIGS. 5 to 11, the clamping part 5200 of the fixing unit 5000 of the turret tool post 1 for a machine tool according to the exemplary embodiment of the present disclosure includes the third couplings 5210. In addition, as illustrated in FIGS. 5 to 11, the clamping part 5200 of the fixing unit 5000 of the turret tool post 1 for a machine tool according to another exemplary embodiment of the present disclosure further includes the fourth couplings 5220.

The third coupling 5210 is connected to one end of the third flow path 5130, and the third coupling 5210 and the first coupling 4230 are clamped or unclamped by the rotation of the rotary unit 4000 and the forward or rearward movement of the cylinder 5110, thereby allowing the first flow path 4210 and the third flow path 5130 to communicate with each other or blocking the communication between the first flow path 4210 and the third flow path 5130. Therefore, as the third coupling 5210 and the first coupling 4230 are clamped or unclamped, the hydraulic pressure supplied from the hydraulic pressure supply part 5310 may be supplied to the first flow path 4210 through the third flow path 5210 or the hydraulic pressure may be recovered.

The fourth coupling 5220 is connected to one end of the fourth flow path 5140, and the fourth coupling 5220 and the second coupling 4260 are clamped or unclamped by the rotation of the rotary unit 4000 and the forward or rearward movement of the cylinder 5110, thereby allowing the second flow path 4240 and the fourth flow path 5140 to communicate with each other or blocking the communication between the second flow path 4240 and the fourth flow path 5140. Therefore, as the fourth coupling 5220 and the second coupling 4260 are clamped or unclamped, the pneumatic pressure supplied from the pneumatic pressure supply part 5320 may be supplied to the second flow path 4210 through the fourth flow path 5140 or the pneumatic pressure may be recovered. The fourth coupling 5220 and the third coupling 5210 are also formed to be orthogonal to each other based on a center of the clamping part 5200.

Therefore, a size of the clamping part is reduced, and the third coupling and the fourth coupling are most compactly formed in the clamping part, thereby reducing a size of the turret tool post for a machine tool.

According to the turret tool post for a machine tool according to the present disclosure, the operator need not manually remove the optional unit after using the optional unit, thereby achieving convenience for the operator. The optional unit may be released by the simple operation of rotating the rotary unit and moving the cylinder of the fixing unit rearward, and then the machining process may be performed immediately, thereby improving productivity and minimizing machining costs by minimizing non-machining time. A device for supplying pneumatic or hydraulic pressure need not be separately installed, and thus the optional unit may be mounted on all turret tool posts and easily used, such that flexibility of the turret tool post is satisfied, thereby improving consumer satisfaction and improving machining precision and reliability of the machine tool by using various optional units.

In addition, as necessary, the clamping part 5200 may further include guide parts 5230, as illustrated in FIG. 7.

Therefore, when the rotary unit 4000 is rotated, the main body part 4200 of the rotary unit 4000 may be easily coupled to the clamping part 5200 of the fixing unit 5000. The guide part 5230 may be inclined, as necessary. An inclination angle of the guide part 5230 corresponds to an inclination angle of an inclination of the rear side of the main body part 4200, such that the clamping part 5200 and the main body part 4200 may be quickly and easily coupled to each other, thereby improving precision.

As illustrated in FIG. 12, the first coupling 4230 and the second coupling 4260 of the main body part 4200 of the rotary unit 4000 of the turret tool post 1 for a machine tool according to another exemplary embodiment of the present disclosure are unclamped from the first coupling 4230 and the third coupling 5210, respectively, as the cylinder 5110 moves rearward. The turret tool post 1 for a machine tool may further include elastic members 4270 configured to seal the first coupling 4230 and the second coupling 4260 when the second coupling 4260 and the fourth coupling 5220 are unclamped.

The elastic member 4270 may be configured as a coil spring, but the present disclosure is not necessarily limited thereto. In the case of the first coupling 4230 and the second coupling 4260, since the inlets at the rear side of the main body part are sealed by the elastic members 4270, the sealability of the main body part may be maintained from chips produced or cutting oil during the machining process, thereby preventing the equipment from being damaged or broken, and thus reducing maintenance time and maintenance costs.

An operational principle of the turret tool post 1 for a machine tool according to the exemplary embodiment of the present disclosure will be described with reference to FIGS. 3, 4, and 8 to 11.

In the case in which the optional unit needs to be mounted and used, the turret 2000 is rotated by the operation of the drive unit 3000, and the rotary unit 4000 is rotated by the rotation of the turret 2000. Thereafter, the rotary unit 4000 is rotated, and the rotary unit 4000 and the fixing unit 5000 are primarily coupled to each other by the inclination of the guide parts 5230 while facing each other. Thereafter, the optional unit is coupled to the first fitting part 4220 and the second fitting part 4250 of the main body part 4200. Thereafter, when the hydraulic pressure is supplied through the forward pressure supply part 5121 of the cylinder block 5120 of the housing part 5100 of the fixing unit 5000, the hydraulic pressure is collected in the first fluid inlet groove 5111 of the cylinder 5110, the cylinder 5110 is moved forward (to the left in FIGS. 8 to 11) by the hydraulic pressure, and the third coupling 5210 connected to the third flow path 5130 and the fourth coupling 5220 connected to the fourth flow path 5140 are moved forward along with the forward movement of the cylinder 5110, such that the third coupling 5210 and the first coupling 4230 are coupled to communicate with each other, and the fourth coupling 5220 and the second coupling 4260 are coupled to communicate with each other. Thereafter, the hydraulic pressure passes through the third flow path 5130 and the first flow path 4210 via the hydraulic pressure supply part 5310 of the pressure supply part 5300, and then the hydraulic pressure is sequentially transmitted to the optional unit through the first fitting part 4220. Likewise, the pneumatic pressure passes through the fourth flow path 5140 and the second flow path 4240 via the pneumatic pressure supply part 5320 of the pressure supply part 5300, and then the pneumatic pressure is sequentially transmitted to the optional unit through the second fitting part 4250.

In the case in which the optional unit needs to be detached when the optional unit is not used, the hydraulic pressure existing in the optional unit sequentially passes through the first fitting part 4220, the first flow path 4210, and the third flow path 5130 via the hydraulic pressure supply part 5310 of the pressure supply part 5300, and then the hydraulic pressure is recovered to the hydraulic pressure supply part 5310. Likewise, the pneumatic pressure existing in the optional unit sequentially passes through the second fitting part 4250, the second flow path 4240, and the fourth flow path 5140 via the pneumatic pressure supply part 5320 of the pressure supply part 5300, and then the pneumatic pressure is recovered to the pneumatic pressure supply part 5320. Thereafter, when the hydraulic pressure is supplied through the rearward pressure supply part 5122 of the cylinder block 5120 of the housing part 5100 of the fixing unit 5000, the hydraulic pressure is collected in the second fluid inlet groove 5112 of the cylinder 5110, the cylinder 5110 is moved rearward (to the right in FIGS. 8 to 11) by the hydraulic pressure, and the third coupling 5210 connected to the third flow path 5130 and the fourth coupling 5220 connected to the fourth flow path 5140 are moved rearward along with the rearward movement of the cylinder 5110, such that the third coupling 5210 is blocked and decoupled from the first coupling 4230, and the fourth coupling 5220 is blocked and decoupled from the second coupling 4260. As described above, when the third coupling 5210 is blocked and decoupled from the first coupling 4230 and the fourth coupling 5220 is blocked and decoupled from the second coupling 4260, the first coupling 4230 and the second coupling 4260 are sealed by the elastic members 4270, as illustrated in FIG. 12, such that it is possible to prevent an inflow of chips or cutting oil during the machining process without a loss of hydraulic pressure and pneumatic pressure in the first flow path and the second flow path.

Thereafter, the turret 2000 is rotated by the operation of the drive unit 3000, and the rotary unit 4000 is rotated by the rotation of the turret 2000. Thereafter, when the rotary unit 4000 is rotated, the rotary unit 4000 and the fixing unit 5000 are separated and moved away from each other by the inclination of the guide parts 5230. Thereafter, the optional unit is detached from the first fitting part 4220 and the second fitting part 4250 of the main body part 4200.

Therefore, according to the turret tool post for a machine tool according to the present disclosure, the rotary unit is mounted on the turret so as to be rotated along with the rotation of the turret, the fixing unit is installed on the tool post body, and the fixing unit and the rotary unit are clamped or unclamped by the rotation of the rotary unit and the forward or rearward movement of the cylinder which is moved forward or rearward in the cylinder block of the fixing unit by pressure, such that the supply of the pneumatic or hydraulic pressure required to operate the optional unit detachably installed on the rotary unit is allowed or cut off, thereby achieving convenience for the operator and preventing inconvenience of removing the optional unit when the optional unit is not used. The optional unit may be released by the simple operation of rotating the rotary unit and moving the cylinder of the fixing unit rearward, and then the machining process may be performed immediately, thereby improving productivity and minimizing machining costs by minimizing non-machining time.

While the present disclosure has been described above with reference to the exemplary embodiments of the present disclosure in the detailed description of the present disclosure, it may be understood, by those skilled in the art or those of ordinary skill in the art, that the present disclosure may be variously modified and changed without departing from the spirit and scope of the present disclosure disclosed in the claims. Accordingly, the technical scope of the present disclosure should not be limited to the contents disclosed in the detailed description of the specification but should be defined only by the claims.

The invention claimed is:

1. A turret tool post for a machine tool, the turret tool post comprising:
   a tool post body;
   a turret installed on the tool post body and configured to receive a plurality of tools and rotate about a central axis of the turret;
   a drive unit installed on the tool post body and configured to provide rotational power to the turret; a rotary unit fixed on the outer circumference of the turret such that the rotary unit rotates about the central axis of the turret when the turret rotates, wherein the rotary unit is coupled to one of a gripper or a steady rest; and
   a fixing unit installed on the tool post body, wherein the fixing unit and the rotary unit are capable of being clamped with or unclamped from each other, and when the fixing unit and the rotary unit are clamped, the fixing unit provides hydraulic pressure and pneumatic pressure for operation of the gripper or the steady rest that is coupled to the rotary unit,
   wherein the rotary unit comprises:
      a base part fastened to the turret; and
      a main body part provided at one side of the base part, wherein the main body part comprises:
         a main body front side surface;
         a main body rear side surface opposite to the main body front side surface;
         a straight first flow path channel formed as part of a first through channel in the main body part that extends from the main body front side surface to the main body rear side surface;
         a first fitting part protruding from the main body front side surface in a direction parallel to a central axis of the first flow path channel and the first fitting part connects with a first end of the first flow path channel, wherein the first fitting part is connected to the gripper or the steady rest;
         a first coupling formed, as a recess, in the main body rear side surface and the first coupling connects with a second end of the first flow path channel;
         a straight second flow path channel spaced apart from the first flow path channel and formed as part of a first through channel in the main body part that extends from the main body front side surface to the main body rear side surface;
         a second fitting part protruding from the main body front side surface in a direction parallel to a central axis of the second flow path channel and the second fitting part connects with a first end of the second flow path channel, wherein the second fitting part is connected to the gripper or the steady rest; and
         a second coupling formed, as a recess, in the main body rear side surface and the second coupling connects with a second end of the second flow path, wherein the fixing unit comprises:
  a housing part installed on the tool post body and comprising a housing front side surface and a housing rear side surface opposite to the housing front side surface;
  a clamping part formed at the housing front side surface, wherein the clamping part is capable of being clamped with or unclamped from the main body part; and
  a pressure supply part formed at the housing rear side surface and the pressure supply part has a hydraulic pressure supply part for supplying hydraulic pressure to the gripper or the steady rest and a pneumatic pressure supply part for supplying pneumatic pressure to the gripper or the steady rest,
  wherein the housing part comprises:
    a cylinder having a first fluid inlet groove and a second fluid inlet groove and the cylinder being configured to move toward or away from the main body part;
    a cylinder block surrounding the cylinder and having a forward pressure supply part for supplying pressure to move the cylinder forward and a rearward pressure supply part for supplying pressure to move the cylinder rearward;
    a straight third flow path channel formed as part of a third through opening extending within the cylinder of the housing part and the clamping part; and
    a straight fourth flow path channel spaced apart from the third flow path channel and formed as part of a fourth through opening extending within the cylinder of the housing part and the clamping part,
  wherein the clamping part comprises:
    a third coupling connected to one end of the third flow path channel, wherein the third coupling is capable of being clamped with or unclamped from the first coupling by respectively moving the cylinder forward or backward in a state that the third coupling and the first coupling are aligned with each other by rotating the rotary unit, wherein, when the third coupling is clamped with the first coupling, the first flow path channel and the third flow path channel communicate with each other such that the central axis of the first flow path channel and a central axis of the third flow path channel are coaxial, and when the third coupling is unclamped from the first coupling, the communication between the first flow path channel and the third flow path channel is blocked,
    a fourth coupling connected to one end of the fourth flow path channel, wherein the fourth coupling is capable of being clamped with or unclamped from the second coupling by respectively moving the cylinder forward or backward in a state that the fourth coupling and the second coupling are aligned each other by rotating the rotary unit, wherein, when the fourth coupling is clamped to the second coupling, the second flow path channel and the fourth flow path channel communicate with each other such that the central axis of the second flow path channel and a central axis of the fourth flow path channel are coaxial, and when the fourth coupling is unclamped to the second coupling, the communication between the second flow path channel and the fourth flow path channel is blocked; and
    inclined guides having respective inclination angles corresponding to a respective inclined sub-surface of the main body rear side surface to assist in coupling the clamping part and the main body part together.

2. The turret tool post of claim 1, wherein the first coupling and the second coupling further comprise elastic members, respectively, for sealing the first coupling and the second coupling when the first coupling and the third coupling are unclamped and the second coupling and the fourth coupling are unclamped as the cylinder moves rearward.

\* \* \* \* \*